Figure 8:
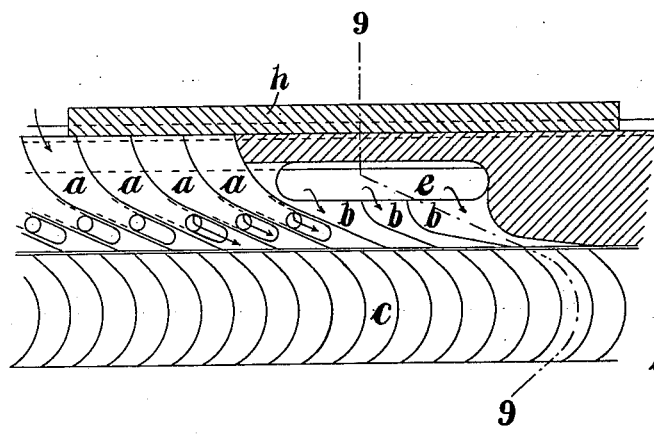

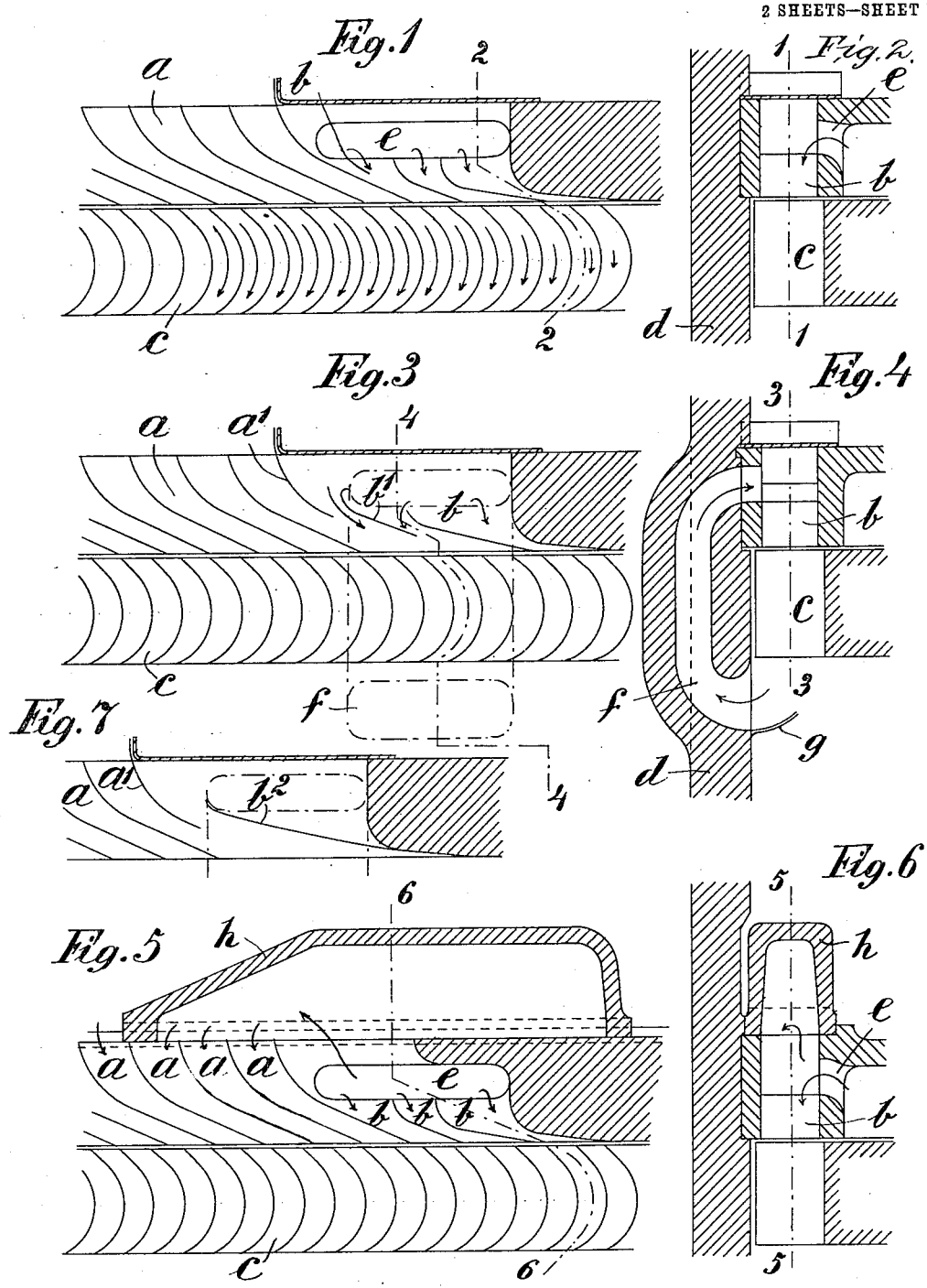

No. 838,309. PATENTED DEC. 11, 1906.
J. W. A. ELLING.
FRACTIONAL SUPPLY TURBINE.
APPLICATION FILED MAR. 23, 1906.

2 SHEETS—SHEET 2.

Witnesses:
Harry Fleischer
John O. Seifert

Inventor:
J. W. A. Elling.
By his Attorney,
F. H. Richards.

UNITED STATES PATENT OFFICE.

JENS WILLIAM AEGIDIUS ELLING, OF CHRISTIANIA, NORWAY.

FRACTIONAL-SUPPLY TURBINE.

No. 838,309.      Specification of Letters Patent.      Patented Dec. 11, 1906.

Application filed March 23, 1906. Serial No. 307,562.

*To all whom it may concern:*

Be it known that I, JENS WILLIAM AEGIDIUS ELLING, a subject of the King of Norway, residing in the city of Christiania, Norway, have invented certain new and useful Improvements in Fractional-Supply Turbines, of which the following is a specification.

It is a well-known fact that in fractional-supply turbines the contents of the wheel-buckets (dead mass of steam or gas) must be worked up to a certain speed or acceleration. The energy consumed for the purpose of obtaining the said acceleration may be considered as latent and cannot be transferred to the wheel during the remaining portion of the supply so long as this supply is normal—*i. e.,* the guide-passages have normal angle and the medium normal velocity. The dead mass of steam or gas contained in the wheel-bucket which has just left the supply will consequently on account of its inertia try to maintain its relative velocity; but as the inlet of the wheel-bucket is either covered by the inside of the casing in which the turbine-wheel runs, so as to shut off any further supply of live steam or gas, or said bucket at best strikes past dead-exhaust mass contained in the chamber wherein the wheel runs it will be seen that the mass of steam or gas contained in the said bucket will create vacuum at the inlet of the bucket. In the first case the latent energy is wholly consumed in producing vibrations in the mass of steam or gas contained in the bucket, while in the second case the said mass will suck exhaust mass through the inlet of the bucket. As, however, the direction of the inrushing exhaust mass is perpendicular to the wheel, a portion of the energy of the wheel will be consumed to give the said exhaust mass such a direction and acceleration that its absolute velocity corresponds to the relative velocity of the mass in the bucket at the moment. This circumstance causes, however, considerable loss of efficiency by impact.

The present invention relates to a method by which the said loss by impact is reduced to a minimum, and the said method consists in by means of certain devices to give the exhaust mass or other equivalent medium before its entry into the bucket such a direction, so that the sucking action of the mass of steam or gas in the bucket may be utilized in accelerating the exhaust mass or other equivalent to the proper absolute velocity.

The devices by which I attain the above-described result consist in the provision of one or more guide-passages arranged at the end of the ordinary guide apparatus and constituting a so-called "retardation" apparatus.

As the velocity of the mass of steam or gas in the buckets successively decreases the angles of the passages of the retardation apparatus should gradually approach the tangent of the periphery of the wheel, because the absolute velocity of the new mass should finally be equal to the peripheral speed of the wheel.

I will now proceed to explain some of the different manners in which I may carry out my said invention, reference being made to the accompanying drawings, in which—

Figure 9:
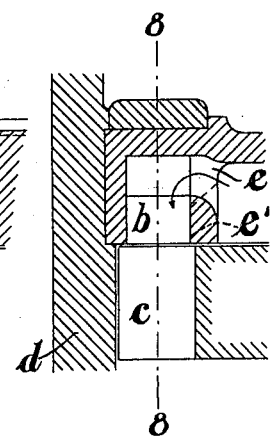
Figure 10:
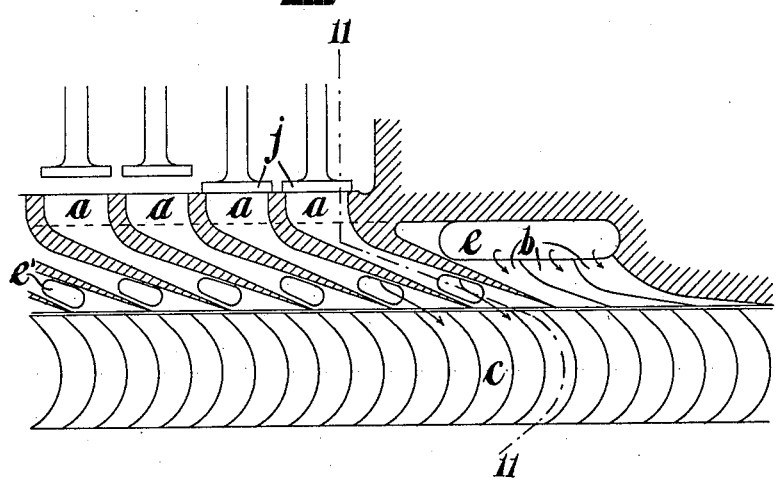
Figure 11:
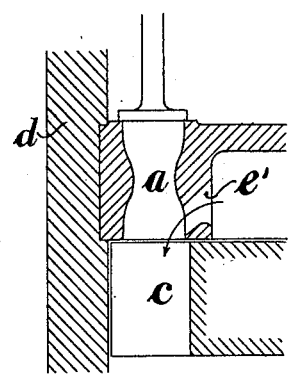

Figure 1 represents longitudinal section of a portion of the normal guide apparatus, of the retardation apparatus, and of a portion of the bucket-rim of the wheel on the line 1 1 in Fig. 2; and Fig. 2 represents cross-sectional view on the line 2 2 in Fig. 1. Fig. 3 represents longitudinal section of a portion of the normal guide apparatus, of the retardation apparatus, and of a portion of the bucket-rim of the wheel on the line 3 3 in Fig. 4; and Fig. 4 is cross-sectional view on the line 4 4 in Fig. 3. Fig. 5 represents longitudinal section of a portion of the normal guide apparatus, of the retardation apparatus, and of a portion of the vane-rim of the wheel on the line 5 5 in Fig. 6; and Fig. 6 is cross-sectional view on the line 6 6 in Fig. 5. Fig. 7 is a modification of the device shown in Fig. 3. Fig. 8 represents longitudinal section of a portion of the normal guide apparatus, of the retardation apparatus, and of a portion of the vane-rim of the wheel on the line 8 8 in Fig. 9. Fig. 9 is a cross-section on line 9 9 in Fig. 8. Fig. 10 represents a view of the same parts as in Fig. 8, but with a modified arrangement of the shut-off valves; and Fig. 11 is a cross-section on line 11 11 in Fig. 10.

*a* represents the normal or ordinary guide passages.

*b* represents the retardation-passages.

*c* represents the wheel-buckets, and *d* is the wall of the turbine-casing.

In the execution of my invention shown in Figs. 1 and 2 a port *e* is provided in the side wall of the retardation apparatus, putting the latter in communication with the chamber of the wheel, in this case of sucking exhaust medium from the side of the said chamber that is next to the guide apparatus.

In the execution of my invention shown in Figs. 3 and 4 I provide a by-pass $f$ in the wall of the casing, putting the retardation apparatus in communication with the exhaust side of the wheel. This arrangement is in some cases necessary on account of the ventilator action created by the wheel. $g$ is a deflecting-plate for facilitating the flow of the mass into the passage $f$.

In both cases the exhaust mass should have the same pressure, as the wheel is working by impulse.

By the trials I have made it appears that the sound often heard by fractional-supply turbines driven by elastic medium, steam or gas, is principally created at the point where the supply ends, the reason being that the above-mentioned vacuum (suction) arises suddenly after the normal supply is shut off with regard to the bucket in question. As the said vacuum during the further motion of the said bucket decreases vibrations will be created in the mass contained in the bucket, said vibrations producing a sound even if a retardation apparatus is arranged according to the device shown in Figs. 1 and 2, although the sound is fainter than when such retardation apparatus is not provided. By arranging the retardation apparatus in such a manner that the vacuum is acting more successively the sound will be still fainter or even quite subdued. In Fig. 3 I have shown a suitable arrangement in which the retardation apparatus is combined with the ordinary guide apparatus in the manner that the last vane $a'$ is partially cut away next to the wheel, thereby causing the layer of live steam or gas next to the retardation apparatus to mingle with the exhaust mass coming from the passage $f$, whereby the relative velocity of the mass in the bucket will decrease at a more uniform rate. The said action can be still further extended by shortening one or more of the vanes of the retardation apparatus—for instance, as shown at $b'$ in Fig. 3. Trials have proved that the last-described manner is very efficient to diminish the sound and that the total efficiency may also profit of such a combination, inasmuch as the vacuum otherwise does not always become so great that the exhaust mass thereby can be accelerated up to the desired absolute velocity, and it may then be more advantageous to use live steam or gas to produce the necessary addition of absolute velocity rather than letting the wheel-buckets produce the said acceleration. I have thus by trials with an air-turbine found it very advantageous to employ a curved vane $b^2$, as shown in Fig. 7, having the convex side opposite the wheel, the result being that the vacuum had its maximum (equal to one-quarter of the pressure of the turbine) at about the middle of the said vane.

In Figs. 5 and 6 is shown an arrangement by which the retardation may be advantageously utilized when employing a slide-valve $h$ to shut off the passages of the normal guide apparatus for the regulation of the said apparatus. As will be seen from the drawings, the slide-valve $h$ will conduct the exhaust mass which is coming from the exhaust-chamber through the port $e$ into the normal guide-passages which are last shut off, said passages now having vacuum, and the exhaust mass will thus when the supply is small not pass through the proper retardation-supply passages $b$, because the suction in the latter is little or none.

Figs. 8 and 9 show a turbine having a slide-valve $h$ for shutting off the ordinary guide-passages $a$ from the supply of steam or gas and also show openings $e'$ connecting the guide-passages $a$ with the exhaust-chamber or outlet portion of the wheel. Figs. 10 and 11 show a similar arrangement, in which separate valves $j$ control each of the outlet-ports $a$, into which lead the exhaust-passages $e'$. In this construction the guide-passages $a$ are made divergent at their outlet portions, as shown.

The characteristic feature of the invention consists in that the *vis viva* of the mass contained in the wheel-bucket during the retardation is utilized in the manner that the said mass sucks dead mass from the wheel-chamber or from any other space where the pressure is equal to the pressure in said chamber. In steam or gas turbines having the exhaust leading into the atmosphere the said dead mass may be ordinary air.

The above-described method must not be confounded with the so-called "ventilation" of hydraulic turbines, in which air is let into the closed guide-passages to take the place of the water flowing from the buckets of the wheel. This action is not conditional of the direction of the air, and the relative velocity of the off-running water being theoretically constant to the very last drop the said action ceases entirely at this moment, and thus no retardation takes place during the whole emptying.

Having now described my invention, what I claim as new, and desire to secure by Letters Patent, is—

1. In gas-turbines, the combination with the normal guide apparatus of a supplemental guide apparatus, having one or more vanes the angle of which is smaller than that of the normal guide-vanes and being at the receiving end in communication with a chamber, wherein prevails exhaust-pressure for the purpose of supplying medium of lower pressure to the wheel-buckets directly after having left the normal guide-vanes.

2. In gas-turbines, the combination with the normal guide apparatus of a supplemental guide apparatus having one or more vanes the angle of which is smaller than that of the normal guide-vanes and being at the receiving end in communication with a chamber, wherein prevails exhaust-pressure being also at the discharge end in communication with the last passage of the normal guide apparatus.

3. In gas-turbines, the combination with the normal guide apparatus of a supplemental guide apparatus having one or more vanes the angle of which is smaller than that of the normal guide-vanes and being at the receiving end in communication with a chamber, wherein prevails exhaust-pressure, and a slide-valve having a cavity for establishing communication between the passages of the normal guide apparatus, which are shut off from the normal supply for live steam or gas, and the said chamber or space.

4. In gas-turbines, the combination with the normal guide apparatus of a supplemental guide apparatus having one or more vanes the angle of which is smaller than the normal guide-vanes and being at the receiving end in communication with an exhaust-chamber, and passages leading from said chamber or space to each of the normal guide-passages in proximity to the point of the latter where the expansion is completed.

5. In a turbine, the combination with the normal guide-passages, of one or more supplemental passages, in communication with a portion of the turbine containing exhaust-pressure.

6. In a turbine, the combination with the normal guide-passages, of one or more supplemental passages in communication with the turbine adjacent the outlet of the wheel-vanes.

7. In a turbine, the combination with the normal guide-passages, of one or more supplemental passages in communication with the turbine adjacent the outlet of the wheel-vanes, and a deflector-plate for conducting the exhaust fluid into the supplemental passages.

8. In a turbine, the combination with the normal guide-passages, of passages leading into said passages adjacent their outlet portions, said passages being in communication with a portion of the turbine containing exhaust-pressure.

In testimony whereof I affix my signature in presence of two witnesses.

JENS WILLIAM AEGIDIUS ELLING.

Witnesses:
N. G. FAUDBERG,
HENRY BORDEMICH.